United States Patent
Khandelwal et al.

(10) Patent No.: US 7,440,955 B2
(45) Date of Patent: Oct. 21, 2008

(54) METHOD AND SYSTEM TO COMPARE DATA OBJECTS

(75) Inventors: Shashikant Khandelwal, Palo Alto, CA (US); Vinay Kakade, Palo Alto, CA (US); Ranjit Padmanabhan, Palo Alto, CA (US); Dhiraj Pardasani, Palo Alto, CA (US); Alex Meyer, Palo Alto, CA (US)

(73) Assignee: IM2, Inc, Palo Alto, CA (US)

( * ) Notice: Subject to any disclaimer, the term of this patent is extended or adjusted under 35 U.S.C. 154(b) by 304 days.

(21) Appl. No.: 11/113,883

(22) Filed: Apr. 25, 2005

(65) Prior Publication Data
US 2006/0161560 A1    Jul. 20, 2006

Related U.S. Application Data

(60) Provisional application No. 60/643,947, filed on Jan. 14, 2005, provisional application No. 60/643,948, filed on Jan. 14, 2005, provisional application No. 60/643,924, filed on Jan. 14, 2005.

(51) Int. Cl.
    *G06F 7/00* (2006.01)
(52) U.S. Cl. .................. 707/100; 715/700; 715/866; 707/101; 707/5
(58) Field of Classification Search .............. 707/100; 715/700, 866
See application file for complete search history.

(56) References Cited

U.S. PATENT DOCUMENTS

| | | | | |
|---|---|---|---|---|
| 5,873,081 | A * | 2/1999 | Harel | 707/3 |
| 6,381,609 | B1 * | 4/2002 | Breitbart et al. | 707/103 R |
| 6,738,759 | B1 * | 5/2004 | Wheeler et al. | 707/3 |
| 7,149,733 | B2 * | 12/2006 | Lin et al. | 707/4 |
| 7,171,400 | B2 * | 1/2007 | Koubenski et al. | 707/3 |
| 2003/0237096 | A1 * | 12/2003 | Barrett et al. | 725/53 |
| 2005/0027681 | A1 * | 2/2005 | Bernstein et al. | 707/1 |
| 2006/0059027 | A1 * | 3/2006 | Berenbach et al. | 705/7 |

OTHER PUBLICATIONS

Jong Lin and Sun-Yuan Kung, Coding and Comparision of DAG's as a Novel Neural Strucure with Applications to On-Line Handwriting Recognition, IEEE Transactions on Signal Porcessing vol. 45, No. 11, Nov. 1997, p. 2701-2708.*

* cited by examiner

*Primary Examiner*—Apu Mofiz
*Assistant Examiner*—Thu Nga Nguyen
(74) *Attorney, Agent, or Firm*—William L. Botjer

(57) ABSTRACT

The invention provides a method and system to compare data objects. Each data object is converted into a directed acyclic graph forest, which comprises one or more directed acyclic graphs. The directed acyclic graph forests corresponding to data objects are then compared to calculate a similarity score between the data objects. The similarity score is then used as a measure to determine the extent of similarity between the data objects.

12 Claims, 9 Drawing Sheets

METHOD AND SYSTEM TO COMPARE DATA OBJECTS

REFERENCE TO RELATED APPLICATIONS

This patent application claims priority of U.S. Provisional Patent Application No. 60/643,947 filed on Jan. 14, 2005

This patent application hereby incorporates by reference U.S. Provisional Patent Application No. 60/643,948 filed on Jan. 14, 2005, titled "Method and system to identify records that relate to a pre-defined context in a data set" and U.S. Provisional Patent Application No. 60/643,924 filed on Jan. 14, 2005, titled "Method and System for Information Extraction".

BACKGROUND

The invention relates to the field of comparison of data objects. More specifically, the invention relates to the conversion of unstructured data objects into structured representations, and subsequent comparison of the structured representations.

The present age is witnessing the generation of large amounts of information. The sources of information such as the internet store information in different forms. There is no common syntax or form of representing the information. Therefore, there is a need of information search techniques that can help in extracting relevant information from volumes of unstructured information available at different sources of information.

Several information search techniques are known in the art. One such technique is keyword search. In keyword search, keywords that relate to a particular information domain are used to search in the information sources.

Another methodology is wrapper induction search. It is a procedure designed to extract information from the information sources using pre-defined templates. Instead of reading the text at the sentence level, wrapper induction systems identify relevant content based on the textual qualities that surround the desired data. For example, a job application form may contain pre-defined templates for various fields such as name, age, qualification, etc. The wrappers, therefore, can easily extract information pertaining to these fields without reading the text on the sentence level.

Yet another methodology for extracting information is an information index system that creates a database by extracting attributes from a plurality of structurally similar texts.

However, the above-mentioned methodologies suffer from one or more of the following limitations. The keyword search techniques generally produce inadequate search results. These techniques do not recognize the context in which a particular searched keyword has appeared. For example, if a user inputs the name of the artist and is looking for the artist's upcoming concerts, the technique may also generate results that may be related to the personal life of the artist. This type of information will be irrelevant for a person who is looking for tickets to the artist's show. Therefore, many non-relevant data sets also get displayed in the search results.

Further, the conventional methodologies fail to incorporate the synonyms and connotations of the keywords that are rife in natural language content. For example, one of the keyword for an upcoming concert's tickets is 'concert'. The conventional techniques might not incorporate the synonyms, such as show, program, performance etc. Wrapper induction methodology proves inefficient in cases where there is a lack of common structural features in the varied information sources.

The methodologies discussed above find specific use in extracting information from texts that have a pre-defined structural form. Further, these methodologies do not re-structure the information in any way to highlight the context and circumvent the nuances and complexities of natural language. Furthermore, the above-mentioned methodologies do not provide related results, which contain keywords related to the ones provided in the search string. For example, if a user wants to search for concert tickets for Madonna's show, the websites selling tickets for Britney Spear's show may also be relevant for the user. These related results are not displayed through the existing search methodologies, since the existing techniques do not pass on the weights associated with the relevant search results to other related search results, which relate to the same context as the relevant search results. In other words, the techniques do not provide context-based search for related results.

In light of the above limitations, it is apparent that there is a need for a scalable methodology for comparison of data objects that identifies relevant content within the data objects, and compares the data objects based on the identified content. The method should be able to identify the presence of certain attributes within the data objects that relate to an information domain or context of interest to the user. The search methodology should also assign certain weights to related search result that may be relevant to a user. Further, there is a need for a methodology that converts data objects into structured representations in order to compare the data objects. Furthermore, there is a need for a methodology that compares the context in which keywords are used in data objects.

SUMMARY

The present invention provides a method to compare data objects. The data in the data objects pertains to a domain knowledge model. The domain knowledge model is a description of one or more attributes, which relate to a particular knowledge domain and the relationships between them.

The method for comparing data objects comprises the following steps; first, converting the data objects into directed acyclic graph forests; and second, determining the extent of similarity between the directed acyclic graph forests. The directed acyclic graphs forests comprise a set of directed acyclic graphs, which are formed based on one or more attributes of the domain knowledge model. Further, the invention provides a system and a computer program product to execute the above-mentioned method.

The method and system may be used for data extraction, searching, document comparison and other applications. The comparison of documents takes place by converting the documents into directed acyclic graph forests and then comparing the directed acyclic graph forests. Further, weights are assigned to the nodes of directed acyclic graphs based on the presence of data related to predefined attributes in the data objects. The weight assigned to each node is also propagated to ancestor and descendent nodes of the node. The method and system therefore provides a concept-based comparison of data objects.

BRIEF DESCRIPTION OF THE DRAWINGS

The preferred embodiments of the invention will hereinafter be described in conjunction with the appended drawings provided to illustrate and not to limit the invention, wherein like designations denote like elements, and in which.

DESCRIPTION OF PREFERRED EMBODIMENTS

Figure 1:
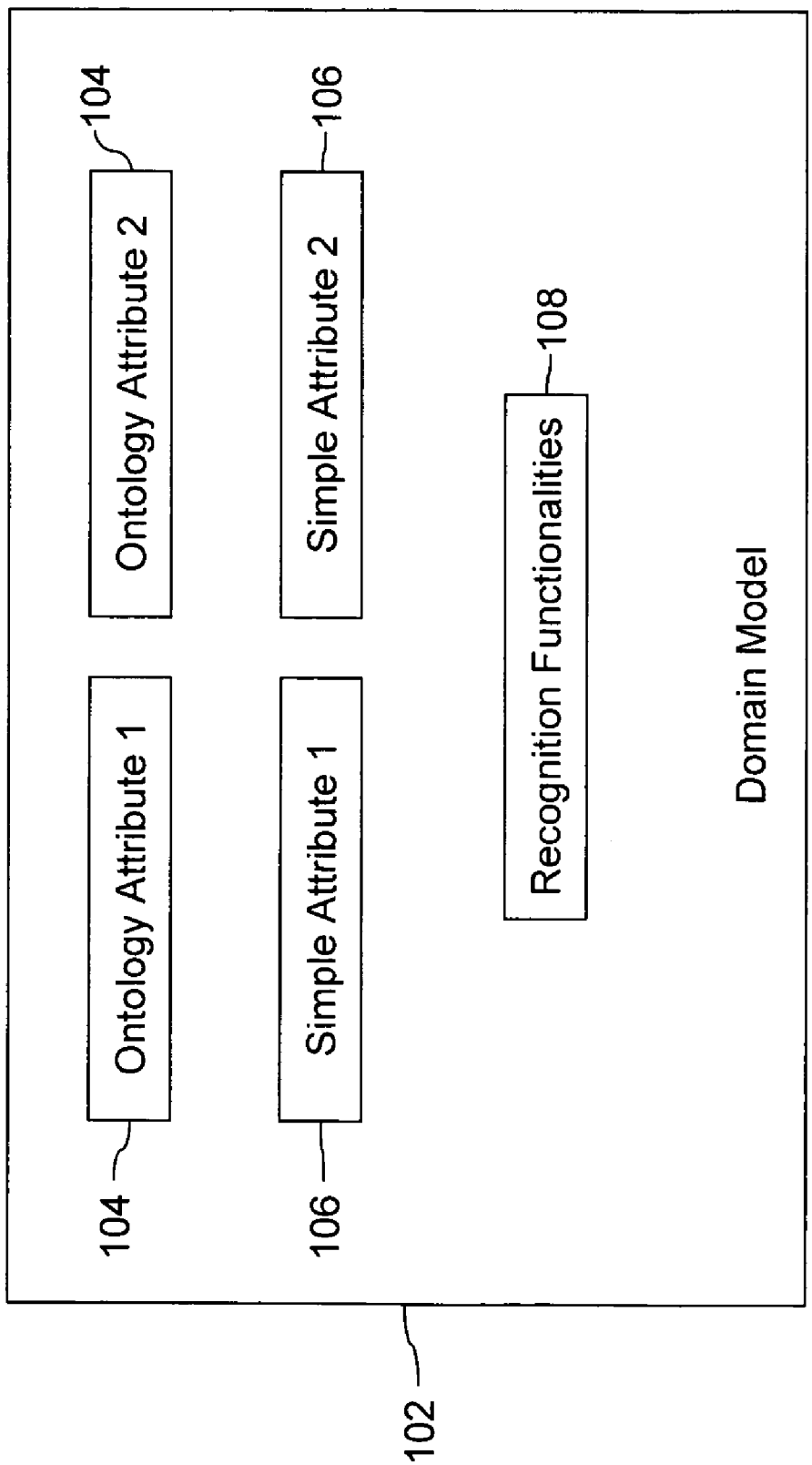
FIG. 1 is a schematic diagram representing a domain model, in accordance with one embodiment of the invention.

For convenience, the terms used to describe the various embodiments are defined below. It should be noted that these definitions are provided to merely aid the understanding of the description, and that they in no way limit the scope of the invention.

Knowledge domain: A knowledge domain includes data pertaining to a specific field or domain.

Attributes: Attributes are the characteristics that define a knowledge domain. For example, in the knowledge domain of online purchase of concert tickets, the attributes are the name of the artist, venue of the concert, price of tickets, date of the concert, etc.

Domain model: Domain model is a structured description of a knowledge domain.

Domain model includes attributes of a knowledge domain and functionalities to recognize the values of these attributes.

Directed acyclic graph: A directed acyclic graph (DAG) is a representation of a set of items, each of which is associated with a node of the graph. All nodes of a directed acyclic graph are connected by edges or logical connections which are unidirectional (i.e. directed) in nature. Further, a route traced along connected edges, in the direction specified by the edges, never ends on a node from which the route starts (i.e. acyclicity).

Directed acyclic graph forest: A directed acyclic graph forest is a set of one or more directed acyclic graphs.

Ontology-based attribute: Ontology-based attribute is an attribute that has a multi-level description. Every element in a level is related to its ancestors by certain defined relationships. An ontology based attribute may be represented as a DAG structure.

Simple attribute: Simple attribute is an attribute that can have only one value. Simple attribute may also be defined as an ontology-based attribute with only one node.

Ancestor nodes: In a DAG representation of data, for any given node, ancestor nodes include the nodes that fall on a path traversed from the root node of the DAG to the given node. Root node is always included in the set of ancestor nodes.

Descendent nodes: In a DAG representation of data, for a given node, descendent nodes include the nodes that fall on a path traversed from the given node to all leaf-nodes connected to the given node. All leaf-nodes connected to the given node are included in the set of descendent nodes.

Parent nodes: In a DAG representation of data, parent nodes of a given node are the immediate ancestor nodes of the given node.

Child nodes: In a DAG representation of data, child nodes of a given node are the immediate descendent nodes of the given node.

The invention relates to a method and system for converting data objects into directed acyclic graph forests, based on a knowledge domain model, and thereafter comparing the directed acyclic graph forests to determine the similarity between the corresponding data objects.

In one embodiment, the technique is used for online shopping, where the user-specified search query is matched to the data objects of interest. For example, a user might be interested in the purchase of Nike™ shoes that are blue in color and are priced less than US $50. In this case, the data objects of interest will be webpages that contain information about shoes being offered for sale.

This is done by converting the user query and the web pages into directed acyclic graph forests, based on the domain model of shoes. The domain model provides details of the shoe-related attributes, like price, color, model, brand, size etc, that can be used to compare the search query with the webpages. These directed acyclic graph forests are then compared with each other to ascertain the degree of similarity between them. This helps to identify the webpages that match the requirements specified by the user in his/her query. The details of an embodiment of this method are described with reference to FIGS. 1 through 6 below.

FIG. 1 is a schematic diagram representing a domain model, in accordance with one embodiment of the invention. Domain model 102 comprises zero or more ontology attributes 104, zero or more simple attributes 106, and recognition functionalities 108. Domain model 102 is a description of a knowledge domain. The knowledge domain includes data pertaining to a specific field or domain. A few examples of the knowledge domain include knowledge domains pertaining to information regarding online purchase of concert tickets, electronics, shoes, and the like. Ontology attributes 104 and simple attributes 106 are predefined attributes for domain model 102. Ontology attributes 104 and simple attributes 106 relate to the knowledge domain of domain model 102. For example, if domain model 102 relates to the knowledge domain of online purchase of tickets for public events, ontology attributes 104 and simple attributes 106 may include attributes like type of event, location, price of the entry ticket, date, and time.

Ontology attributes 104 are multi-level attributes, which may be represented as a Directed Acyclic Graph (DAG). Directed acyclic graph is hereinafter referred to as DAG. DAG is a multi-level representation of a set of items, each of which is associated with a node of the graph. All nodes of a DAG are connected by edges or logical connections which are unidirectional (i.e. directed) in nature. Further, a route traced along connected edges, in the direction specified by the edges, never ends on a node from which the route starts (i.e. acyclicity).

For example, if domain model 102 relates to the knowledge domain of online purchase of tickets for public events, the attribute for location of the event may be represented by ontology attribute 104. The attribute for location may have multi-level attribute values like state, city, street etc. Simple attribute 106 are single node attributes that have a single value associated with each attribute. For example, if domain model 102 relates to the knowledge domain of online purchase of tickets for public events, the attribute for price of the entry ticket of the event may be represented by simple attribute 106. The attribute for the price of the entry ticket will have a single value only, such as US $50.

Although, only two ontology attributes 104 and two simple attributes 106 have been represented in FIG. 1, it will be apparent to one skilled in the art that domain model 102 may comprise several ontology attributes 104 and simple attributes 106.

Figure 2:
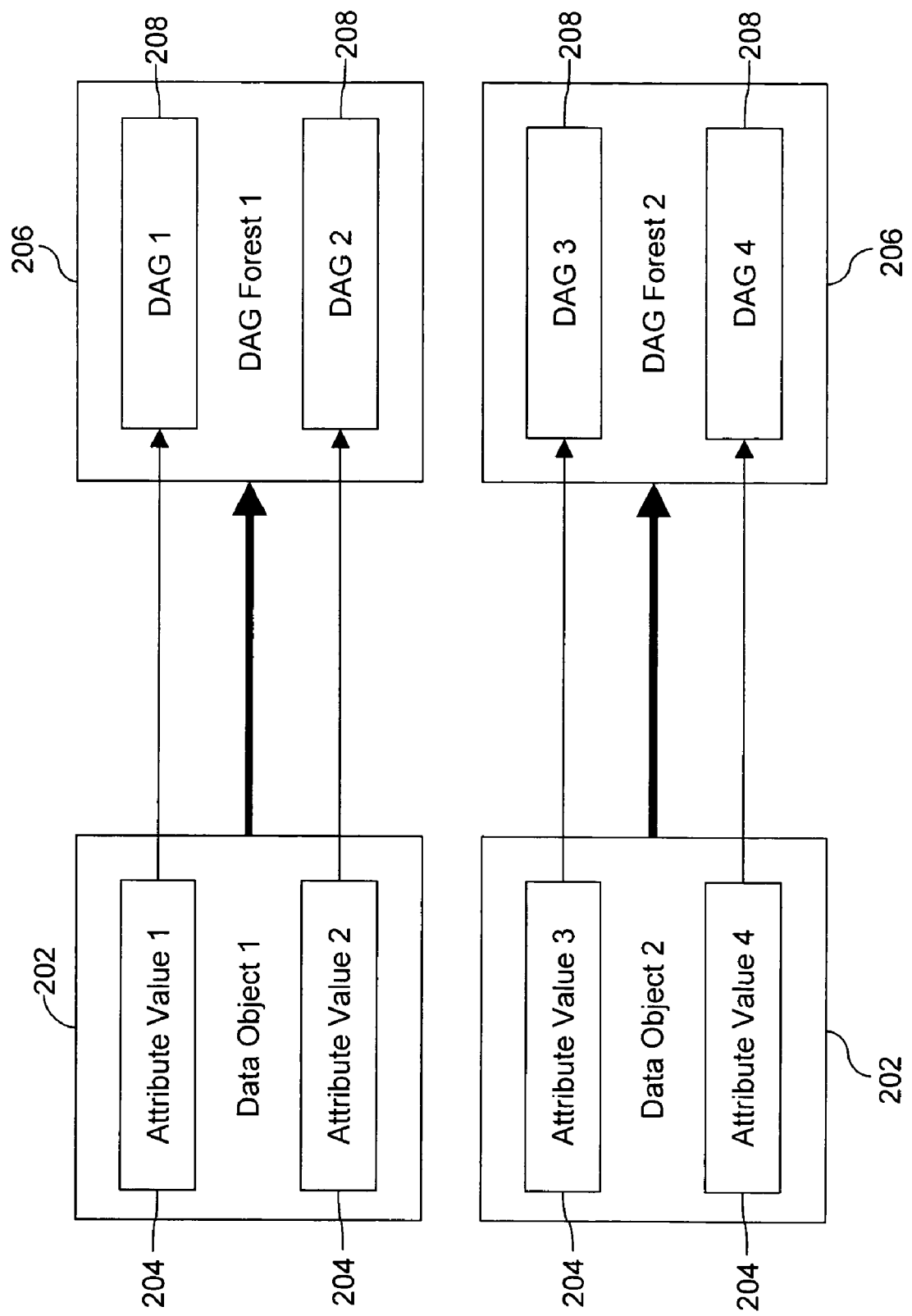
FIG. 2 is a schematic diagram representing data objects and the corresponding directed acyclic graph forests, in accordance with one embodiment of the invention.

FIG. 2 is a schematic diagram representing data objects and corresponding directed acyclic graph forests, in accordance with one embodiment of the invention. Data object 202 may be a text document, an XML feed, a web page or any other form of data. Data objects 202 comprise attribute values 204. Attribute values 204 are defined by ontology attributes 104 and simple attributes 106 of domain model 102.

For example, in the case of online shopping, if the attribute is the price for a ticket, the value of the attribute may be $50. Each data object 202 is converted into a corresponding directed acyclic graph forest 206 (DAG forest 206). A DAG forest is a set of one or more DAGs. Each attribute value 204 of each data object 202 is converted into a corresponding DAG 208. The method for converting data object 202 into DAG forest 206 is described in detail in conjunction with FIG. 4.

Domain model 102 further comprises recognition functionalities 108. Recognition functionalities 108 help in identifying attribute values in data object 202 for an attribute described by domain model 102. Recognition functionalities 108 include variants, synonyms or alternative names for each attribute defined by domain model 102.

For example, in case of online purchase of tickets for a football match, if an attribute for a football team name is defined as "San Francisco 49ers", an alternative name like "49ers" or "sf 9ers" will be recognized by recognition functionalities 108. Further, according to one embodiment of the invention, recognition functionalities 108 are capable of recognizing 'stop words'. Stop words are strings or words that do not contribute to any attribute. For example, stop words may include works like "the", "and", "is" and the like.

Figure 3:
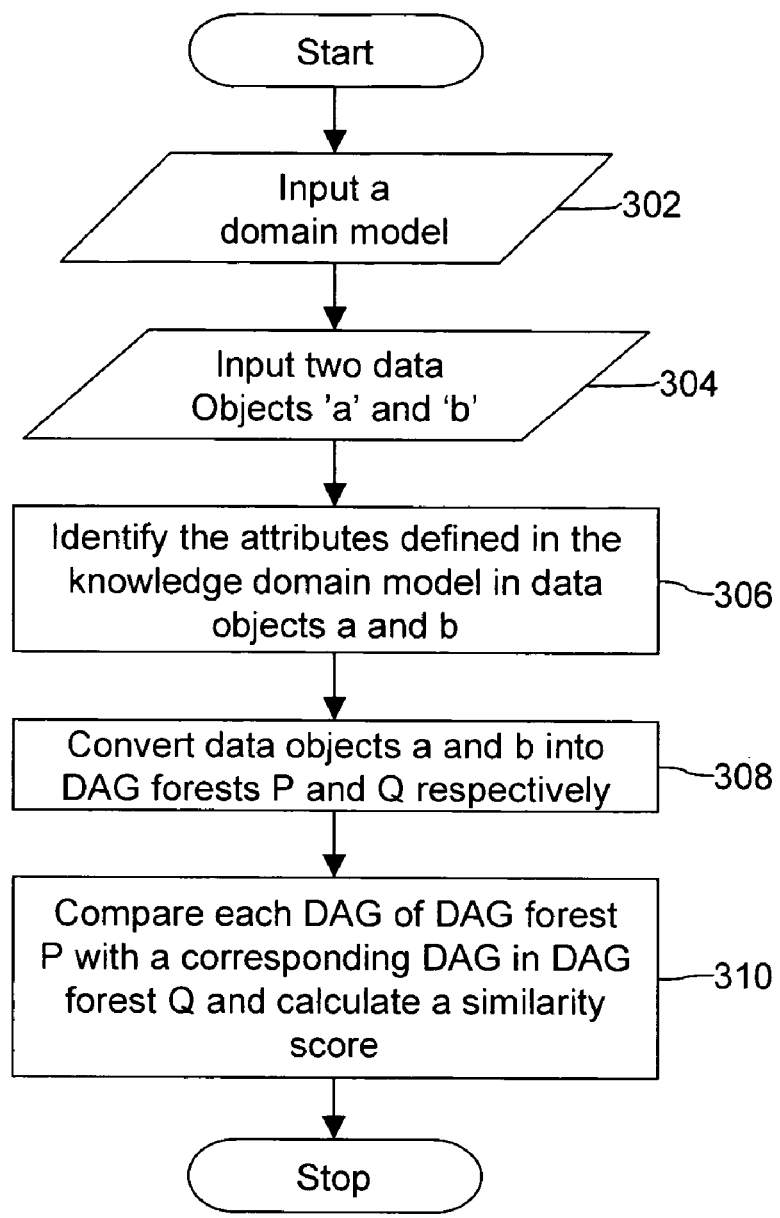
FIG. 3 is a flowchart representing a method to compare two data objects, in accordance with one embodiment of the invention.

FIG. 3 is a flowchart representing a method to compare two data objects, in accordance with one embodiment of the invention. At step 302, domain model 102 pertaining to a particular knowledge domain is obtained. Thereafter, at step 304, two data objects 202, for example, data object 'a' and data object 'b' are obtained. Examples of data object 'a' and data object 'b' include a user-specified search query, a text document, an XML feed, a web page or any other form of data. At step 306, the values for the attributes defined by domain model 102 are identified in data object 'a' and data object 'b'. Based on the identified attributes, data object 'a' and data object 'b' are converted into DAG forest P and DAG forest Q respectively, at step 308. The method for converting a data object into a DAG forest is described in detail in conjunction with FIGS. 4A and 4B. Subsequently, at step 310, each DAG of DAG forest P is compared with a corresponding DAG of DAG forest Q to calculate a similarity score between DAG forest P and DAG forest Q. The method for calculating the similarity score is described in detail in conjunction with FIGS. 6A and 6B.

Figure 4A:
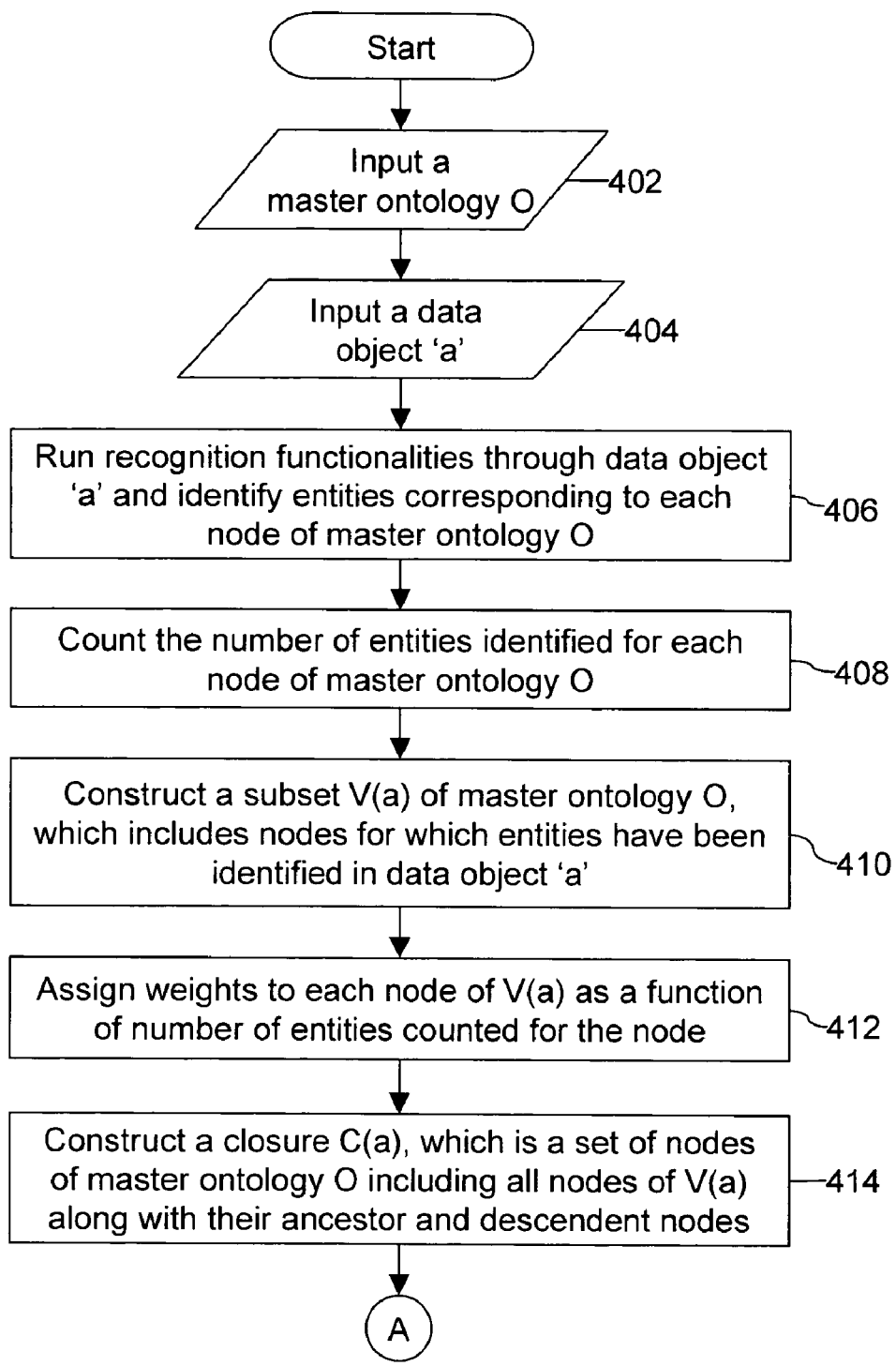
FIGS. 4A and 4B show a flowchart that represents a method for converting a data object into a DAG forest, in accordance with one embodiment of the invention.
Figure 4B:
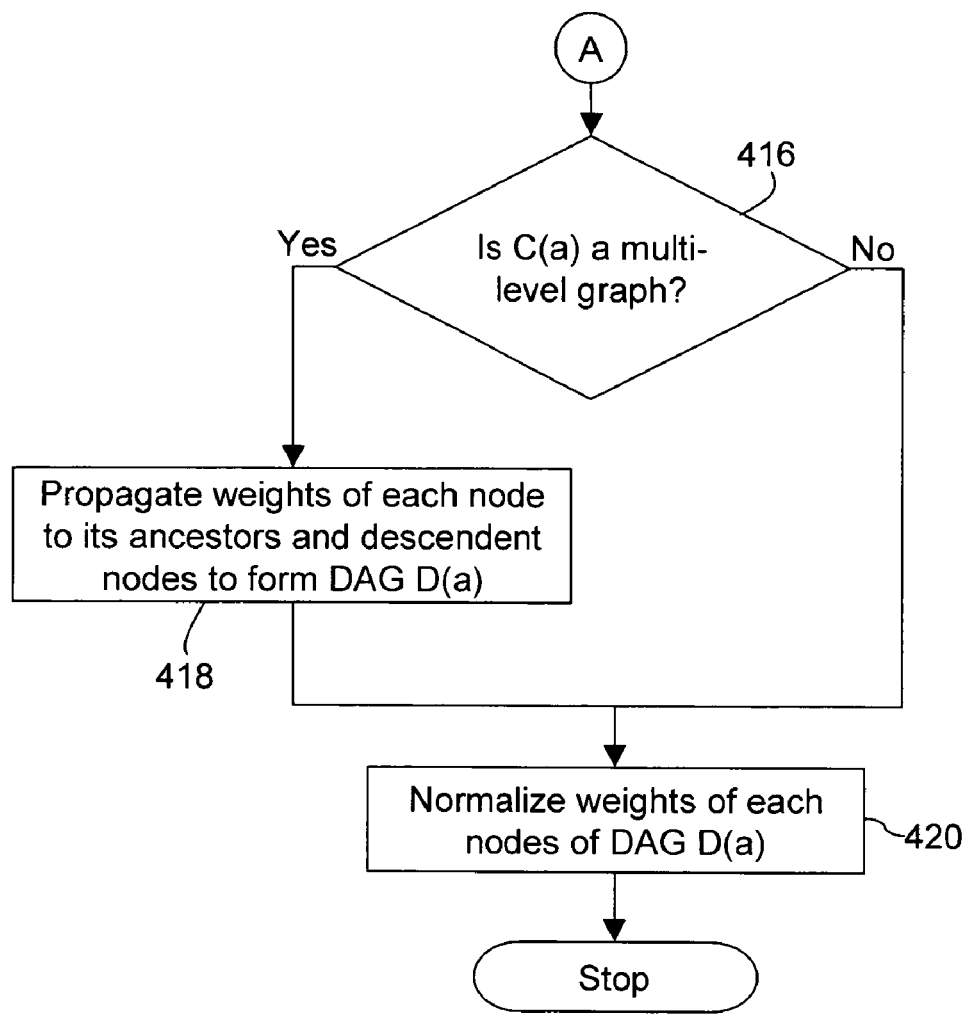

FIGS. 4A and 4B show a flowchart that represents a method for converting a data object into a DAG forest, in accordance with one embodiment of the invention. At step 402, a master ontology O is obtained. Master ontology O pertains to a particular ontology attribute defined by domain model 102. For example, if the ontology attribute is location, domain model 102 defines the master ontology as a DAG. This master ontology will include names of all the states, names of all cities in each state, and names of all streets in each city. Master ontology O has a DAG structure, which comprises several nodes.

At step 404, a data object 202, for example data object 'a', is obtained. Thereafter at step 406, recognition functionalities 108 are run through data object 'a' and values for the attributes in data object 'a' are identified. The values for the attributes are text strings or other pieces of data that correspond to particular nodes of master ontology O. After the recognition of the values, according to one embodiment of the invention, the number of times that a value corresponding to a node of master ontology O appears in data object 'a', is counted. The counting of values takes place at step 408. Thereafter at step 410, a set of nodes V(a) is constructed. V(a) is a subset of master ontology O that includes nodes for which values have been identified in data object 'a'.

Subsequently at step 412, non-negative real weights are assigned to each node of V(a). According to one embodiment of the invention, weights are assigned to each node based on the number of values identified for the corresponding node. For example, if the number of values corresponding to a first node is more than the number of values corresponding to a second node, the first node is assigned with a higher weight than the second node.

At step 414, a closure C(a) is constructed, which is a portion of master ontology O that includes all the nodes of V(a), along with the ancestor nodes and descendent nodes of the nodes of V(a). The nodes of C(a) carry the same weights as those assigned to the nodes of V(a). At step 416, a check is performed to identify if C(a) is a multi-level, ontology-based graph or a single-node graph. A multi-level, ontology-based graph has multiple nodes, which are connected to each other in a DAG structure. A single-node graph has only one node. If C(a) is found to be a multi-level, ontology-based graph, step 418 is performed. At step 418, the weight assigned to each node is propagated to its ancestor and descendent nodes to form a weighted DAG D(a). Thereafter, at step 420, the weights on each node of DAG D(a) are normalized. Several known normalization techniques may be used for normalization of weights. For example, L2 Normalization may be employed to normalize the weights of DAG D(a).

According to one embodiment of the invention, the propagation of weights is performed based on a predefined up-weight value and a predefined down-weight value assigned to each edge. An edge is defined as the connection between a parent-child node pair. In a DAG representation of data, parent nodes of a given node are the immediate ancestor nodes of the given node and the child nodes of a given node are the immediate descendent nodes of the given node. The up-weight value defines the fraction of weight that is propagated from a node to its parent node. For example, consider a node $N_{Ch}$ which is connected to its parent node $N_{Pa}$ through an edge $E_{Ch-Pa}$. Consider the weight assigned to node $N_{Ch}$ is 'w' and the up-weight value for edge $E_{Ch-Pa}$ is 'f'. Then the weight propagated to node $N_{Pa}$ is equal to w×f. Similarly, the down-weight value defines the fraction of weight that is propagated from a node to its child node.

Figure 5:
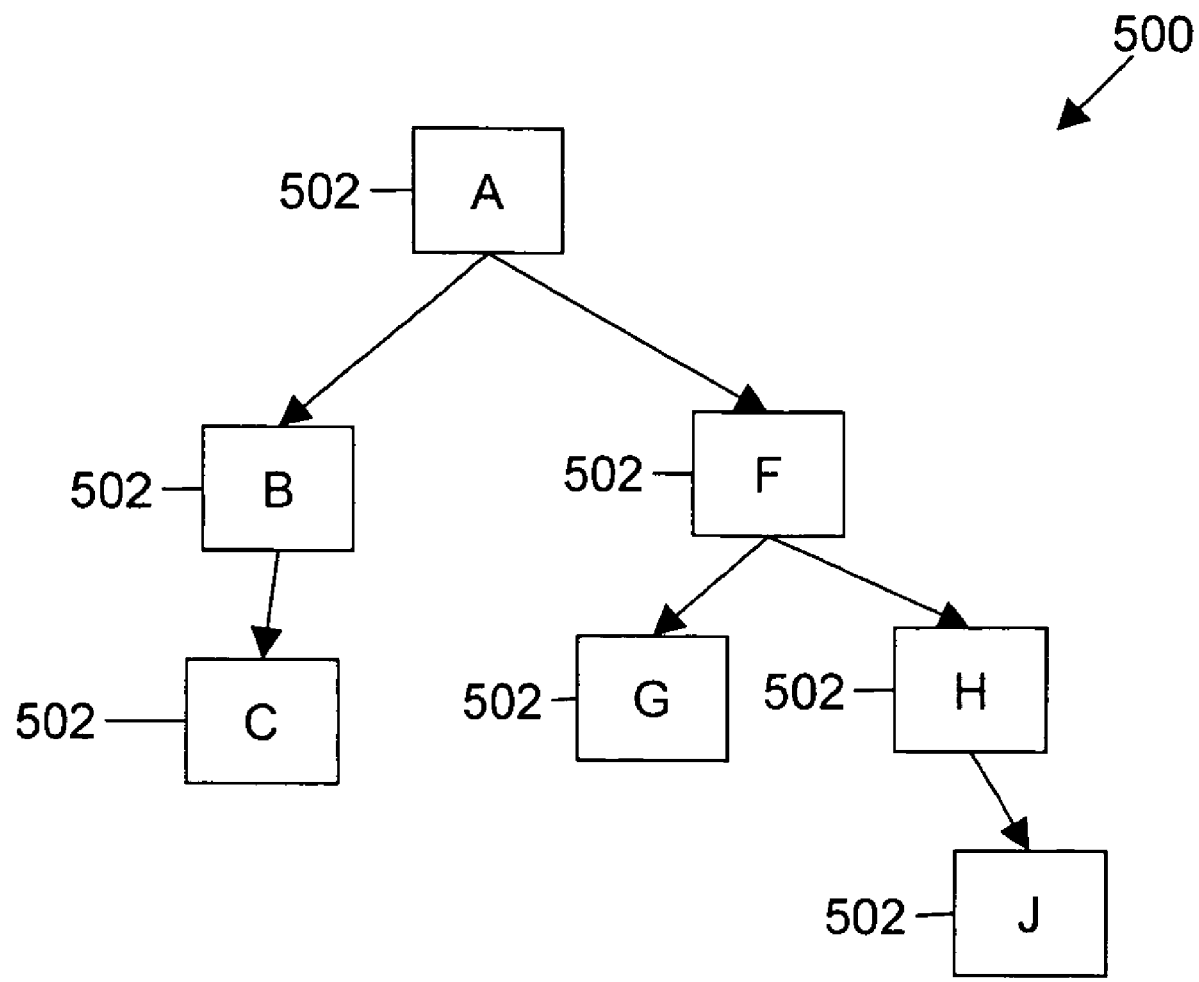
FIG. 5 is an exemplary directed acyclic graph closure.

FIG. 5 is an exemplary DAG closure. According to step 414 of FIGS. 4A and 4B, data object 'a' is converted into a DAG closure 500. DAG closure 500 comprises one or more nodes 502. For example, if the attribute value corresponding to node G appears 10 times in data object 'a', then a weight equal to 10 is assigned to node G. Further, if the attribute value corresponding to node J appears 20 times in data object 'a', a weight of 20 is assigned to node J.

Node F is the parent node for node G. Therefore, the weight of node G is propagated to node F according to the up-weight value of the edge between node G and node F. If the up-weight value of the edge between node G and node F is 0.5, then the weight propagated to node F from node G is equal to 5 (10×0.5). Similarly, if the up-weight value of the edge between node H and node J is equal to 0.4, then the weight propagated to node H from node J is equal to 8 (20×0.4).

The weight assigned to node H is then propagated to node F. For example, if the up-weight value of the edge between node F and node H is 0.3, the weight propagated to node F from node H is equal to 2.4 (8×0.3). The weights propagated to Node F from G and node H will be added. Therefore, the total weight on node F is equal to 7.4 (5+2.4). Similarly, the weights on B and F are propagated to node A. Further, in a manner similar to the one described for upward propagation, the weights are also propagated downwards from a node to its child nodes. The downward propagation of weights is done using a down-weight value of the edges connecting the node and the child nodes.

In case of online shopping, propagating weights to parent and child nodes allows also a user to search for related results. For example, in FIG. 5, assume that node F relates to pop music concerts, node G relates to concerts of Madonna and node H relates to concerts of Britney Spears. If a user enters a search query that contains the word 'Madonna', a certain weight will be assigned to Node G. This weight will be propagated to node F and the weight propagated to node F will be further propagated down to node H. Therefore, when a user searches for a ticket for Madonna's concert, websites selling Britney Spears' concert tickets will also be displayed to the user.

The steps illustrated in FIGS. 4A and 4B are repeated for each attribute defined by domain model 102. A master ontology for each attribute is used to construct a DAG for data object 'a'. Hence a set of several weighted DAGs, each DAG for one attribute is obtained from Data object 'a'. The set of DAGs is termed as the DAG forest corresponding to data object 'a'.

Figure 6A:
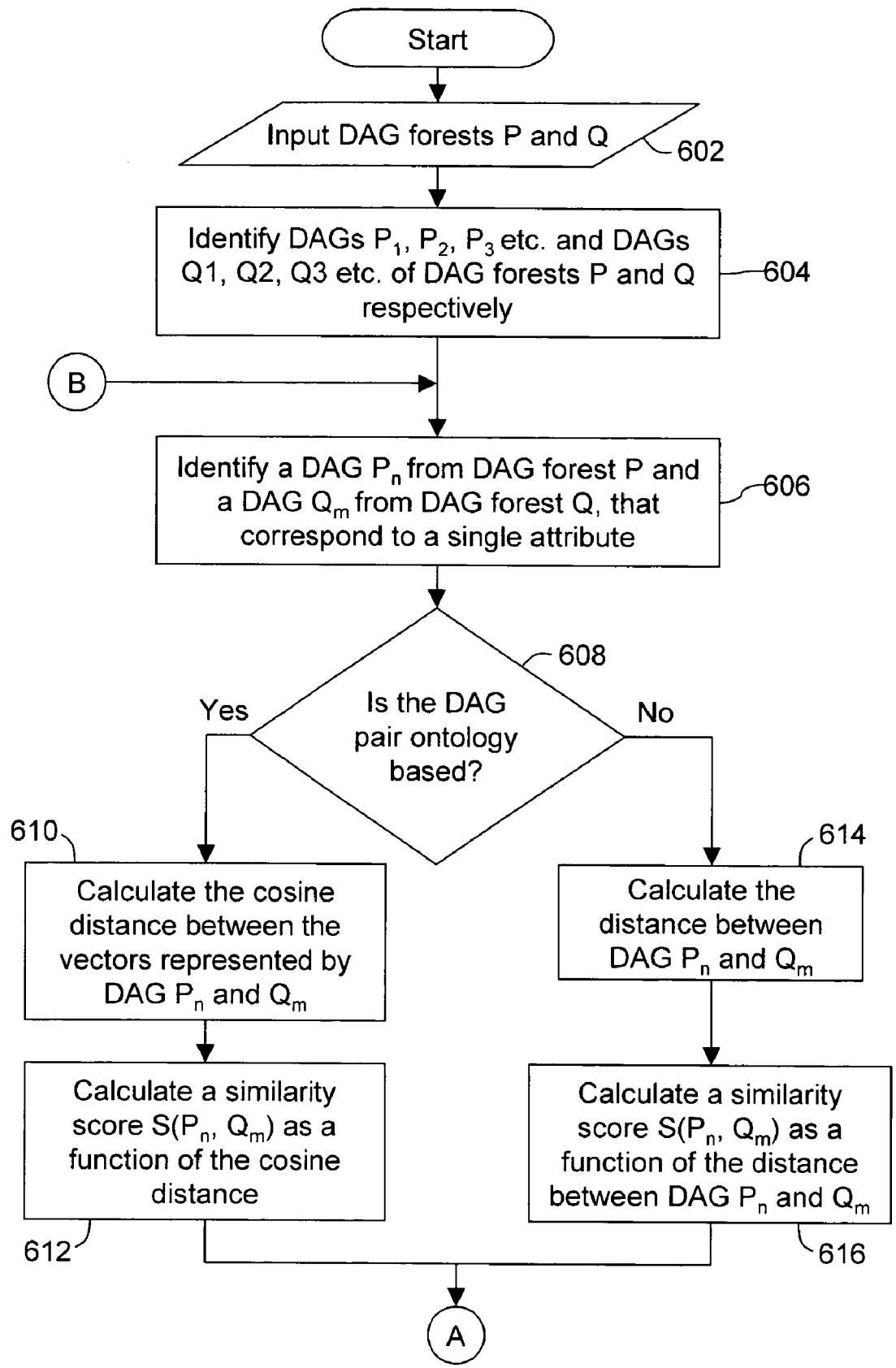
FIGS. 6A and 6B show a flowchart that represents a method for calculating a similarity score between two DAG forests, in accordance with one embodiment of the invention.
Figure 6B:
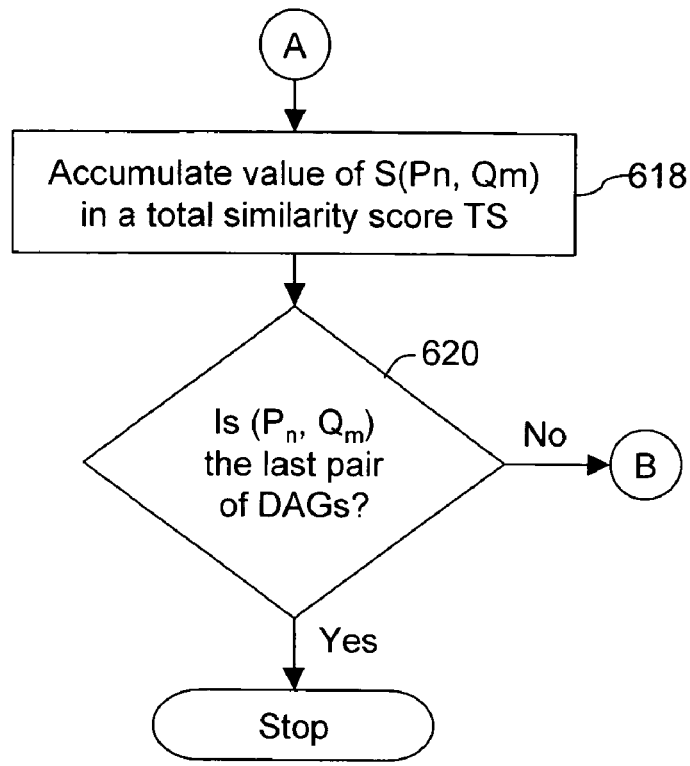

FIGS. 6A and 6B show a flowchart that represents a method for calculating a similarity score between two DAG forests, in accordance with one embodiment of the invention. At step 602, two DAG forests, for example, DAG forest P and DAG forest Q, are obtained. The DAGs of DAG forest P and Q are then identified at step 604.

For example, consider a DAG forest P, which comprises DAGs $P_1, P_2, P_3 \ldots P_n$ and DAG forest Q, which comprises DAGs $Q_1, Q_2, Q_3 \ldots Q_n$. At step 606, a pair of DAGs, one from DAG forest P and one from DAG forest Q, which correspond to a single attribute of domain model 102, are identified. For example, if a DAG $P_n$ from DAG forest P and a DAG $Q_m$ from DAG forest Q correspond to a single attribute, such as location, then DAG pair $P_n$-$Q_m$ is selected. At step 608, DAG $P_n$ and $Q_m$ are checked for being multi-level, ontology-based DAGs or single-node DAGs. Since both DAG $P_n$ and $Q_m$ correspond to a single attribute, both DAG $P_n$ and $Q_m$ will either be ontology-based or single-node based DAGs. If DAGs $P_n$ and $Q_m$ are found to be ontology based DAGs, step 610 is executed. At step 610, the cosine distance between the vectors represented by $P_n$ and $Q_m$ is calculated. Thereafter, according to one embodiment of the invention, at step 612, the cosine distance calculated in step 610 is used to calculate a similarity score $S(P_n, Q_m)$ between DAGs $P_n$ and $Q_m$. For example, if the cosine distance between a first pair of DAGs is less than the cosine distance between a second pair of DAGs, then the first pair of DAGs will have a higher similarity score as compared to the second pair of DAGs.

Referring back to step 608, if DAG $P_n$ and $Q_m$ are found to be single-node DAGs, step 614 is executed. At step 614, the distance between DAG $P_n$ and $Q_m$ is calculated. Thereafter, at step 616, the similarity score $S(P_n, Q_m)$ between DAGs $P_n$ and $Q_m$ is calculated, as a function of the distance between DAGs $P_n$ and $Q_m$. Subsequent to steps 612 and 616, step 618 is executed. At step 618, the value of the similarity score $S(P_n, Q_m)$ is accumulated in a total similarity score TS. It will be apparent to one skilled the art that other methods for calculating similarity score may also be used.

At step 620, a check is performed to confirm whether DAG pair $P_n$-$Q_m$ is the last DAG pair to be used for calculation of total similarity score TS. If DAG pair $P_n$-$Q_m$ is not the last pair, step 606 is executed. At step 606, a new DAG pair $P_n$-$Q_m$ is identified and subsequent steps are repeated for this pair of DAGs. In the manner described in FIGS. 6A and 6B, similarity score for all the pairs of DAGs in the two DAG forests are calculated and accumulated in total similarity score TS.

Figure 7:
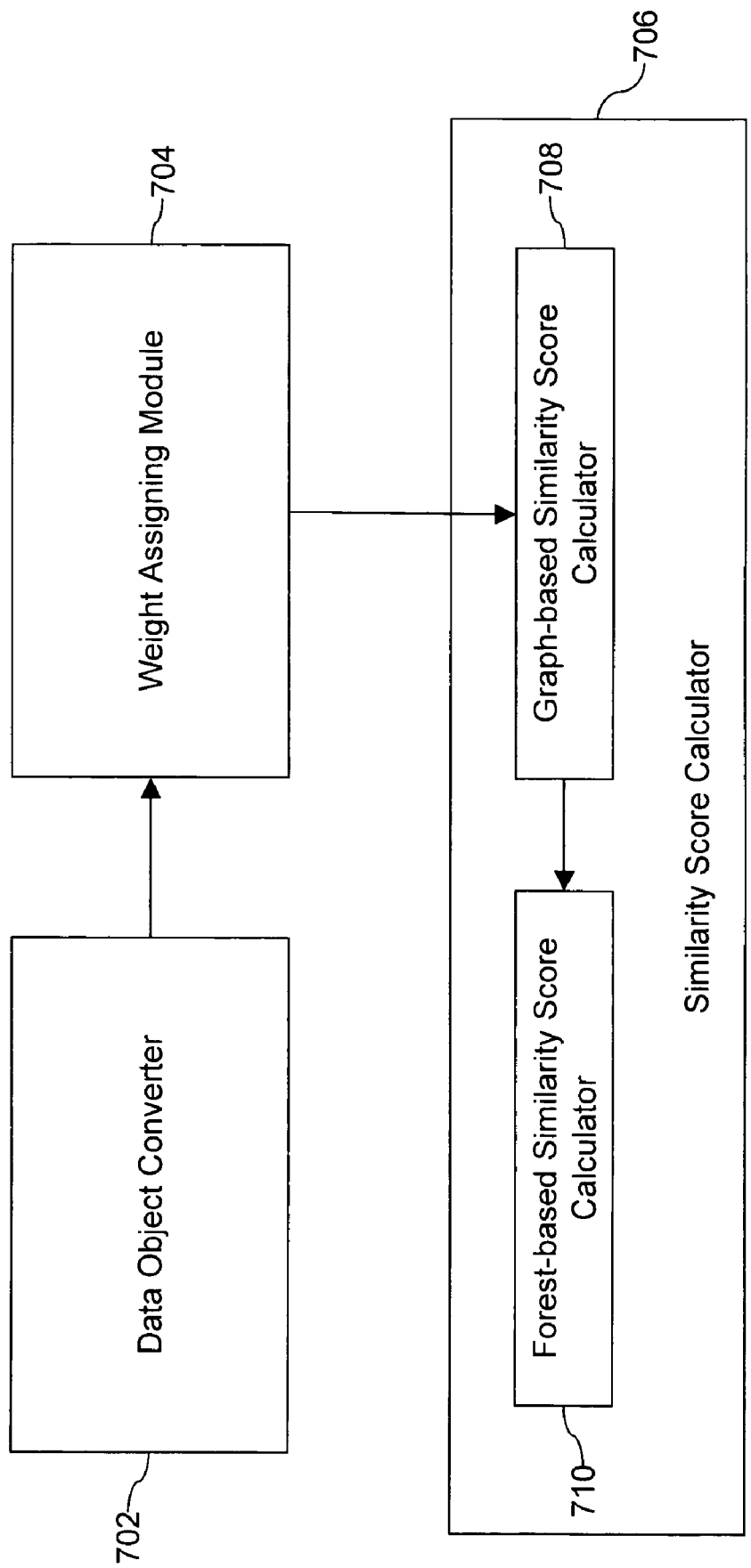
FIG. 7 is a schematic diagram representing the system elements of the invention, in accordance with one embodiment of the invention.

FIG. 7 is a schematic diagram representing the system elements of the invention, in accordance with one embodiment of the invention. The system converts data objects into directed acyclic graph forests and thereafter compares two directed acyclic graph forests to determine the similarity between the two corresponding data objects. The system comprises a data object converter 702, a weight assigning module 704, and a similarity score calculator 706.

Data object converter 702 inputs data objects 202 and identifies attribute values 204 within data object 202. Further, data object converter converts each attribute value 204 into a corresponding DAG 208. In this manner, data object converter 702 converts data object 202 into DAG forest 206, which comprises one DAG 208 for each attribute value 204 of data object 202. Data object converter 702 outputs DAG forest 206.

Weight assigning module 704 inputs DAG forest 206 from data object converter 702. Weight assigning module 704 assigns weights to each node of DAG forest 206 and converts DAG forest 206 into a weighted DAG forest. According to one embodiment of the invention, weight assigning module assigns weights to DAG forest 206 in two steps. In the first step, weight assigning module assigns weight to the nodes of DAG forest 206, for which corresponding attribute values are identified in data object 202. According to one embodiment of the invention, the weights are assigned as a function of the number of appearance of the attribute value in data object 202. In the second step, the weight assigned to each node is propagated to its ancestor and descendent nodes. The propagation of nodes is based on a predefined up-weight and down-weight value associated with each edge of DAG forest 206. Weight assigning module 704 outputs a weighted DAG forest.

Similarity score calculator 706 comprises a graph-based similarity score calculator 708 and a forest based similarity score calculator 710. Similarity score calculator 706 inputs a set of weighted DAG forests and calculates a forest-based similarity score between the weighted DAG forests.

Graph-based similarity score calculator 708 extracts a set of two weighted DAGs, each from a different weights DAG forest, such that the weighted DAGs correspond to a single attribute. Graph-based similarity score calculator 708 calculates a graph-based similarity score between the weighted DAGs.

The graph-based similarity score is calculated using different methodologies for different types of DAGs. For example, for ontology-based DAGs, the cosine distance between the vectors represented by the DAGs is used to calculate the graph-based similarity score. In this manner, graph-based similarity score calculator 708 calculates graph-based similarity score between all pairs of weighted DAGs that correspond to a single attribute.

Forest-based similarity score calculator 710 inputs the graph-based similarity scores from graph-based similarity score calculator and calculates a forest-based similarity score between a pair of weighted DAG forests. The forest-based similarity score between a pair of weighted DAG forests is calculated as a function of the graph-based similarity scores between all the pairs of weighted DAGs, one from each weighted DAG forest, that correspond to a single attribute. For example, forest-based similarity score calculator 710 accumulates all the graph-based similarity scores to calculate the forest-based similarity score. Forest-based similarity score calculator 710 outputs a forest-based similarity score between a pair of weighted DAG forests.

The invention provides a method and system for converting data objects into directed acyclic graph forests, based on a knowledge domain model and thereafter comparing two directed acyclic graph forests to determine the similarity between the two data objects. The method and system may therefore be used for data extraction, searching, document comparison and other applications. The comparison of documents takes place by converting the documents into DAG forests and then comparing the DAG forests. Since weights are assigned to nodes of DAGs and the weights are also propagated to ancestor and descendent nodes, the method and system also provides concept based comparison.

The invention also provides a computer program code for the execution of the method of the invention. The method may be implemented in various computer languages such as, Java, C, C++, Perl, Python, LISP, BASIC, Assembly, etc. The implementation of the method does not require any specific platform. Any platform that can provide means of support for simple arrays and associative arrays, which represent hierarchies, may be used.

The system, as described in the present invention or any of its components, may be embodied in the form of a computer system. Typical examples of a computer system includes a general-purpose computer, a programmed microprocessor,. a micro-controller, a peripheral integrated circuit element, and other devices or arrangements of devices that are capable of implementing the steps that constitute the method of the present invention.

The computer system comprises a computer, an input device, a display unit and the Internet. Computer comprises a microprocessor. Microprocessor is connected to a communication bus. Computer also includes a memory. Memory may include Random Access Memory (RAM) and Read Only Memory (ROM). Computer system further comprises storage device. It can be a hard disk drive or a removable storage drive such as a floppy disk drive, optical disk drive and the like. Storage device can also be other similar means for loading computer programs or other instructions into the computer system.

The computer system executes a set of instructions that are stored in one or more storage elements, in order to process input data. The storage elements may also hold data or other information as desired. The storage element may be in the form of an information source or a physical memory element present in the processing machine.

The set of instructions may include various commands that instruct the processing machine to perform specific tasks such as the steps that constitute the method of the present invention. The set of instructions may be in the form of a software program. The software may be in various forms such as system software or application software. Further, the software might be in the form of a collection of separate programs, a program module with a larger program or a portion of a program module. The software might also include modular programming in the form of object-oriented programming. The processing of input data by the processing machine may be in response to user commands, or in response to results of previous processing or in response to a request made by another processing machine.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A method for comparing a first data object with a second data object, the first data object comprising first unstructured data, the first unstructured data comprising one or more first sets of ontology-based attributes pertaining to a domain knowledge model, the second data object comprising second unstructured data, the second unstructured data comprising one or more second sets of ontology-based attributes pertaining to the domain knowledge model, the domain knowledge model comprising one or more data acyclic graphs representing the one or more first sets of ontology-based attributes and the one or more second sets of ontology-based attributes, the method comprising the steps of:

a. converting the first data object into a first directed acyclic graph forest, the first directed acyclic graph forest comprising a first set of one or more directed acyclic graphs, wherein the first set of one or more data acyclic graphs are constructed from the one or more directed acyclic graphs of the domain knowledge model representing the one or more first set of ontology-based attributes of the first data object;

b. converting the second data object into a second directed acyclic graph forest, the second directed acyclic graph forest comprising a second set of one or more directed acyclic graphs, wherein the second set of one or more data acyclic graphs are constructed from the one or more directed acyclic graphs of the domain knowledge model representing the one or more second set of ontology-based attributes of the second data object;

c. determining a graph-based similarity score between each directed acyclic graph of the first set of one or more directed acyclic graphs and a corresponding directed acyclic graph of the second set of one or more directed acyclic graphs, wherein the graph based similarity score is determined by calculating a cosine distance between vectors defined by the each directed acyclic graph of the first set of one or more directed acyclic graphs and the corresponding directed acyclic graph of the second set of one or more directed acyciic graphs; and d. determining a forest-based similarity score between the first directed acyclic graph forest of the first data object and the second directed acyclic graph forest of the second data object, wherein the forest-based similarity score is calculated as a function of the graph-based similarity score between each directed acyclic graph of the first set of one or more directed acyclic graphs and a corresponding directed acyclic graph of the second set of one or more directed acyclic graphs.

2. The method of claim 1, wherein the first set of one or more directed acyclic graphs and the second set of one or more directed acyclic graphs are constructed by the steps of:

a. assigning weights to each of the one or more first set of identified nodes of the one or more directed acyclic graphs of the domain knowledge model corresponding to the one or more first set of ontology based attributes, wherein the weights being assigned based on presence of the first unstructured data corresponding to the one or more first set of ontology-based attributes in the first data object;

b. assigning weights to each of the one or more second set of identified nodes of the one or more directed acyclic graphs of the domain knowledge model corresponding to the one or more second set of ontology based attributes, wherein the weights being assigned based on presence of the second unstructured data corresponding to the one or more second set of ontology-based attributes in the second data object;

c. propagating the weights assigned to each of the one or more first set of identified nodes to the corresponding ancestor nodes and descendant nodes of each of the one or more directed acyclic graphs of the domain knowledge model to construct the first set of one or more directed acyclic graphs representing the one or more first set of ontology-based attributes, wherein the one or more first set of identified nodes with ancestor nodes and descendant nodes are present in the first set of one or more directed acyclic graphs representing the one or more first set of ontology-based attributes; and d. propagating the weights assigned to each of the one or more second set of identified nodes to the corresponding ancestor nodes and descendant nodes of each of the one or more directed acyclic graphs of the domain knowledge model to from the second set of one or more directed acyclic graphs representing the one or more second set of ontology-based attributes, wherein the one or more second set of identified nodes with ancestor nodes and descendant nodes are present in the second set of one or more directed acyclic graphs representing the one or more second set of ontology-based attributes.

3. The method of claim 2, wherein the step of propagating the weights further comprises the step of:

a. normalizing the weights of each of the one or more identified first set of nodes of the first set of one or more directed acyclic graphs and one or more second set of identified nodes of the second set of one or more directed acyclic graphs, wherein the normalization is based on the weights assigned to the corresponding ancestor nodes and the corresponding descendant nodes of the one or more first set of identified nodes and the one or more second set of identified nodes.

4. The method of claim 1, wherein first unstructured data in the first data object is at least one of a text document, an XML document, a web page and a natural language query.

5. The method of claim 1, wherein the second unstructured data in the second data object is at least one of a text document, an XML document, a web page and a natural language query.

6. A system for comparing a first data object with a second data object, the first data object comprising first unstructured data, the first unstructured data comprising one or more first sets of ontology-based attributes pertaining to a domain knowledge model, the second data object comprising second unstructured data, the second unstructured data comprising one or more second sets of ontology-based attributes pertaining to the domain knowledge model, the domain knowledge model comprising one or more data acyclic graphs representing the one or more first sets of ontology-based attributes and the one or more second sets of ontology-based attributes, the system comprising:

a processor;

a. a data converter to convert the first data object into a first directed acyclic graph forest and the second data object into a second directed acyclic graph forest, the first directed acyclic graph forest comprising a first set of one or more directed acyclic graphs wherein the first set of one or more data acyclic graphs are constructed from the one or more directed acyclic graphs of the domain knowledge model representing the one or more first set of ontology-based attributes of the first data object and the second directed acyclic graph forest comprising a second set of one or more directed acyclic graphs wherein the second set of one or more data acyclic graphs are constructed from the one or more directed acyclic graphs of the domain knowledge model representing the one or more second set of ontology-based attributes of the second data object the first set of one or more directed acyclic graphs being formed based on one or more first set of one or more ontology based attributes of the first data object and b. a similarity-calculator to determine the extent of similarity between the first directed acyclic graph forest and the second directed acyclic graph forest, the similarity calculator comprising:

a graph-based similarity-score calculator to determine a graph-based similarity score between each directed acyclic graph of the first set of one or more directed acyclic graphs and a corresponding directed acyclic graph of the second set of one or more directed acyclic graphs, wherein the graph based similarity score is determined by calculating a cosine distance between vectors defined by the each directed acyclic graph of the first set of one or more directed acyclic graphs and the corresponding directed acyclic graph of the second set of one or more directed acyclic graphs; and a forest-based similarity-score calculator to determine a forest-based similarity score between the first directed acyclic graph forest of the first data object and the second directed acyclic graph forest of the second data object, wherein the forest-based similarity score is calculated as a function of the graph-based similarity score between each directed acyclic graph of the first set of one or more directed acyclic graphs and a corresponding directed acyclic graph of the second set of one or more directed acyclic graphs.

7. The system of claim 6, further comprising:

a. a weight assigning module for assigning weights to each one or more first set of identified nodes of the one or more directed acyclic graphs of the domain knowledge model corresponding to the one or more first sets of ontology based attributes and each one or more second sets of identified nodes of the one or more directed acyclic graphs of the domain knowledge model corresponding to the one or more second set of ontology based attributes and for propagating weights assigned to the each one or more first set of identified nodes to corresponding ancestor nodes and descendant nodes of each of the one or more directed acyclic graphs of the domain knowledge model to construct the first set of one or more directed acyclic graphs representing the one or more first set of ontology-based attributes, wherein the one or more first set of identified nodes with ancestor nodes and descendant nodes are present in the first set of one or more directed acyclic graphs representing the one or more first set of ontology-based attributes and to the each one or more second set of identified nodes to the corresponding ancestor nodes and descendant nodes of each of the one or more directed acyclic graphs of the domain knowledge model to construct the second set of one or more directed acyclic graphs representing the one or more second set of ontology-based attributes, wherein the one or more second set of identified nodes with ancestor nodes and descendant nodes are present in the second set of one or more directed acyclic graphs representing the one or more second set of ontology-based attributes.

8. A computer program product for use with a computer, the computer program product comprising a computer usable medium having a computer program code embodied therein for comparing a first data object with a second data object, the first data object comprising first unstructured data, the first unstructured data comprising one or more first set of ontology-based attributes pertaining to a domain knowledge model, the second data object comprising second unstructured data, the second unstructured data comprising one or more second set of ontology-based attributes pertaining to the domain knowledge model, the domain knowledge model comprising one or more data acyclic graphs representing one or more first set of ontology-based attributes and one or more second set of ontology-based attributes, the computer code performing the steps of:

a. converting the first data object into a first directed acyclic graph forest, the first directed acyclic graph forest comprising a first set of one or more directed acyclic graphs, wherein the first set of one or more data acyclic graphs are constructed from the one or more directed acyclic graphs of the domain knowledge model representing the one or more first set of ontology-based attributes of the first data object;

b. converting the second data object into a second directed acyclic graph forest, the second directed acyclic graph forest comprising a second set of one or more directed acyclic graphs, wherein the second set of one or more data acyclic graphs are constructed from the one or more directed acyclic graphs of the domain knowledge model representing the one or more second set of ontology-based attributes of the second data object;

c. determining a graph-based similarity score between each directed acyclic graph of the first set of one or more directed acyclic graphs and a corresponding directed acyclic graph of the second set of one or more directed acyclic graphs, wherein the graph based similarity score is determined by calculating cosine distance between vectors defined by the each directed acyclic graph of the first set of one or more directed acyclic graphs and the corresponding directed acyclic graph of the second set of one or more directed acyclic graphs; and d. determining a forest-based similarity score between the first directed acyclic graph forest of the first data object and the second directed acyclic graph forest of the second data object, wherein the forest-based similarity score is calculated as a function of the graph-based similarity score between each directed acyclic graph of the first set of one or more directed acyclic graphs and a corresponding directed acyclic graph of the second set of one or more directed acyclic graphs.

9. The computer program product of claim 8, wherein the first set of one or more directed acyclic graphs and the second set of one or more directed acyclic graphs are constructed by a computer code performing the steps of:

a. assigning weights to each of the one or more first set of identified nodes of the one or more directed acyclic graphs of the domain knowledge model corresponding to the one or more first set of ontology based attributes, wherein the weights being assigned based on presence of the first unstructured data corresponding to the one or more first set of ontology-based attributes in the first data object;

b. assigning weights to each of the one or more second set of identified nodes of the one or more directed acyciic graphs of the domain knowledge model corresponding to the one or more second set of ontology based attributes, wherein the weights being assigned based on presence of the second unstructured data corresponding to the one or more second set of ontology-based attributes in the second data object;

c. propagating the weights assigned to each of the one or more first set of identified nodes to corresponding ancestor nodes and corresponding descendant nodes of each of the one or more directed acyclic graphs of the domain knowledge model to construct the first set of one or more directed acyclic graphs representing the one or more first set of ontology-based attributes, wherein the one or more first set of identified nodes with the corresponding ancestor nodes and the corresponding descendant nodes are present in the first set of one or more directed acyclic graphs representing the one or more first set of ontology-based attributes ; and d. propagating the weights assigned to each of the one or more second set of identified nodes to corresponding ancestor nodes and corresponding descendant nodes of each of the one or more directed acyclic graphs of the domain knowledge model to from the second set of one or more directed acyclic graphs representing the one or more second set of ontology-based attributes, wherein the one or more second set of identified nodes with the corresponding ancestor nodes and the corresponding descendant nodes are present in the second set of one or more directed acyclic graphs representing the one or more second set of ontology-based attributes.

10. The computer program product of claim 9, wherein propagating the weights further comprises computer code to perform the step of:

a. normalizing the weights of each of the one or more identified first set of nodes of the first set of one or more directed acyclic graphs and one or more second set of identified nodes of the second set of one or more directed acyclic graphs, wherein the normalization is based on the weights assigned to the corresponding ancestor nodes and the corresponding descendant nodes of the one or more first set of identified nodes and the one or more second set of identified nodes.

11. The method of claim 1, wherein the step of converting the first data object to the first data acyclic graph forest and converting the second data object to the second data acyclic graph forest further comprises the steps of:

a. recognizing variants for each of the one or more first set of ontology-based attributes of the first unstructured data in the one or more directed acyclic graphs of the domain knowledge model, the variants comprising at least one of synonyms for at least one of the one or more first set of ontology-based attributes and alternative names for the at least one of the first set of one or more ontology-based attributes;

b. recognizing variants for each of the one or more second set of ontology-based attributes of the second unstructured data in the one or more directed acyclic graphs of the domain knowledge model, the variants comprising at least one of synonyms for at least one of the one or more second set ontology-based attributes and alternative names for the at least one of the one or more second set of ontology-based attributes;

c. identifying one or more first set of nodes corresponding to each of the one or more first set of ontology-based attributes and variants of each of the one or more first set of ontology-based attributes in the one or more directed acyclic graphs of the domain knowledge model; and d. identifying one or more second set of nodes corresponding to each of the one or more second set of ontology-based attributes and variants of each of the one or more second set of ontology-based attributes in the one or more directed acyclic graphs of the domain knowledge model.

12. The computer program product of claim 8, wherein converting the first data object to the first data acyclic graph forest and converting the second data object to the second data acyclic graph forest further comprises the steps of:

a. recognizing variants for each of the one or more first set of ontology-based attributes of the first unstructured data in the one or more directed acyclic graphs of the domain knowledge model, the variants comprising at least one of synonyms for at least one of the one or more first set of ontology-based attributes and alternative names for the at least one of the first set of one or more ontology-based attributes;

b. recognizing variants for each of the one or more second set of ontology-based attributes of the second unstructured data in the one or more directed acyclic graphs of the domain knowledge model, the variants comprising at least one of synonyms for at least one of the one or more second set ontology-based attributes and alternative names for the at least one of the one or more second set of ontology-based attributes;

c. identifying one or more first set of nodes corresponding to each of the one or more first set of ontology-based attributes and variants of each of the one or more first set of ontology-based attributes in the one or more directed acyclic graphs of the domain knowledge model; and d. identifying one or more second set of nodes corresponding to each of the one or more second set of ontology-based attributes and variants of each of the one or more second set of ontology-based attributes in the one or more directed acyclic graphs of the domain knowledge model.

* * * * *